No. 851,241. PATENTED APR. 23, 1907.
E. O. LINTON.
SIPHONIC MEASURING APPARATUS.
APPLICATION FILED JUNE 8, 1906.
3 SHEETS—SHEET 3.
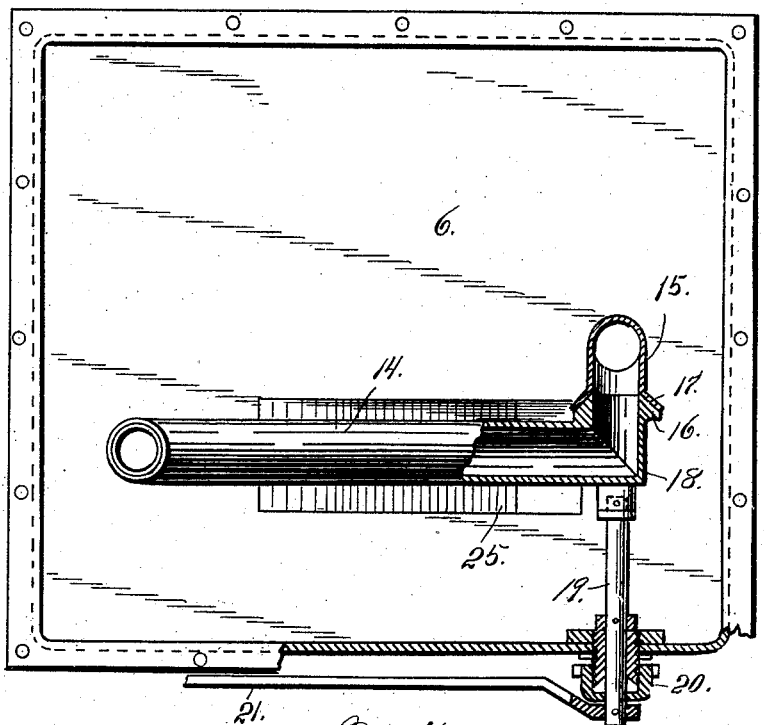
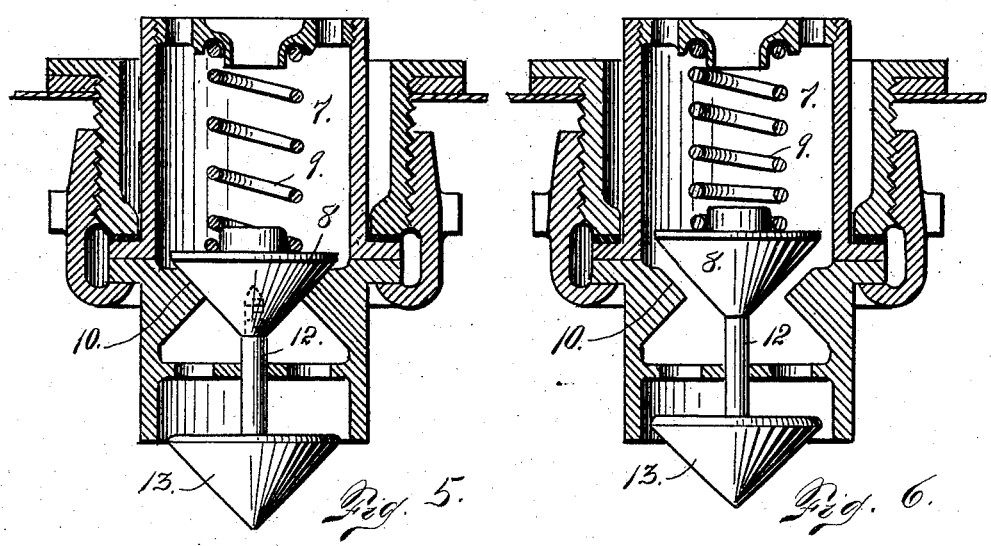

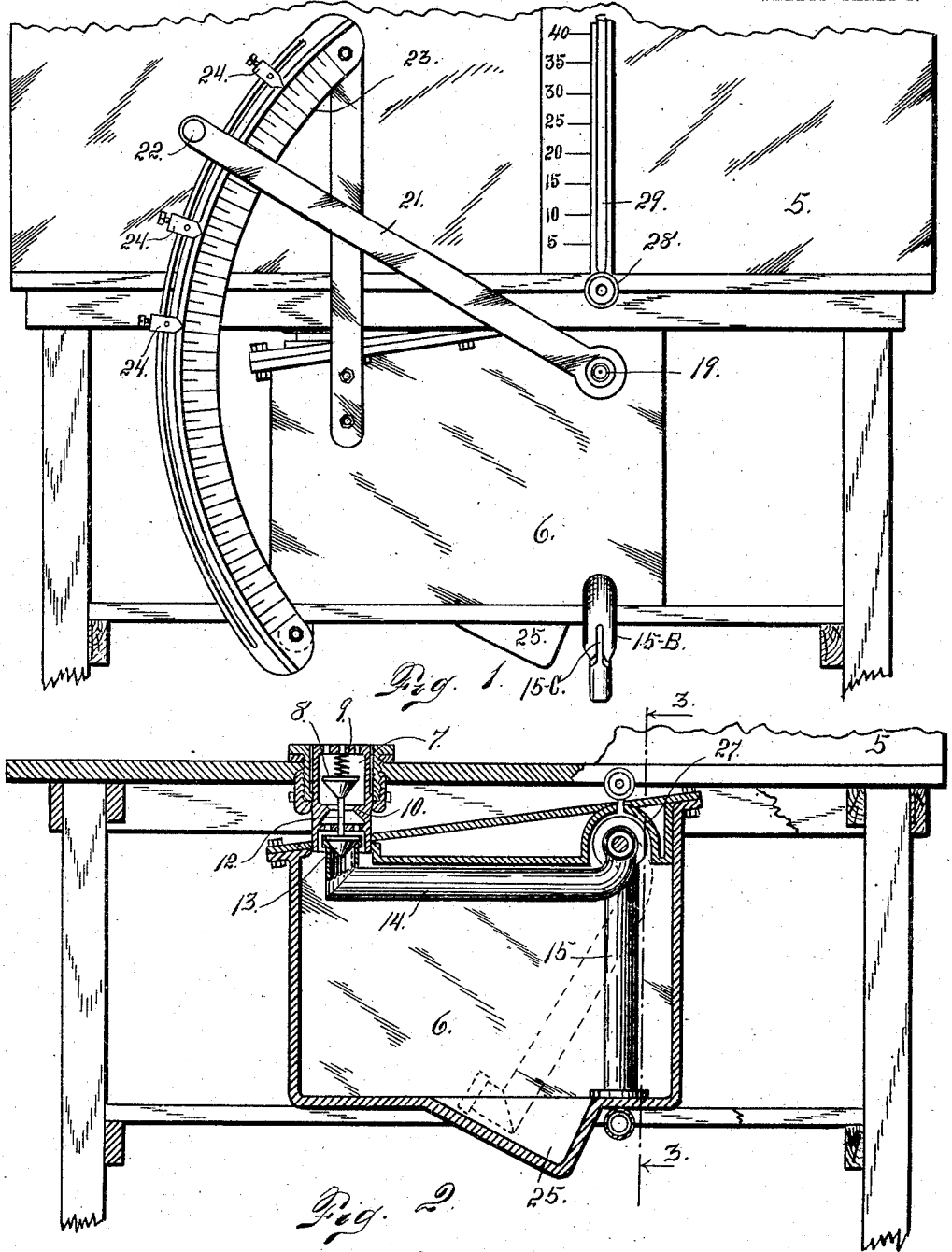

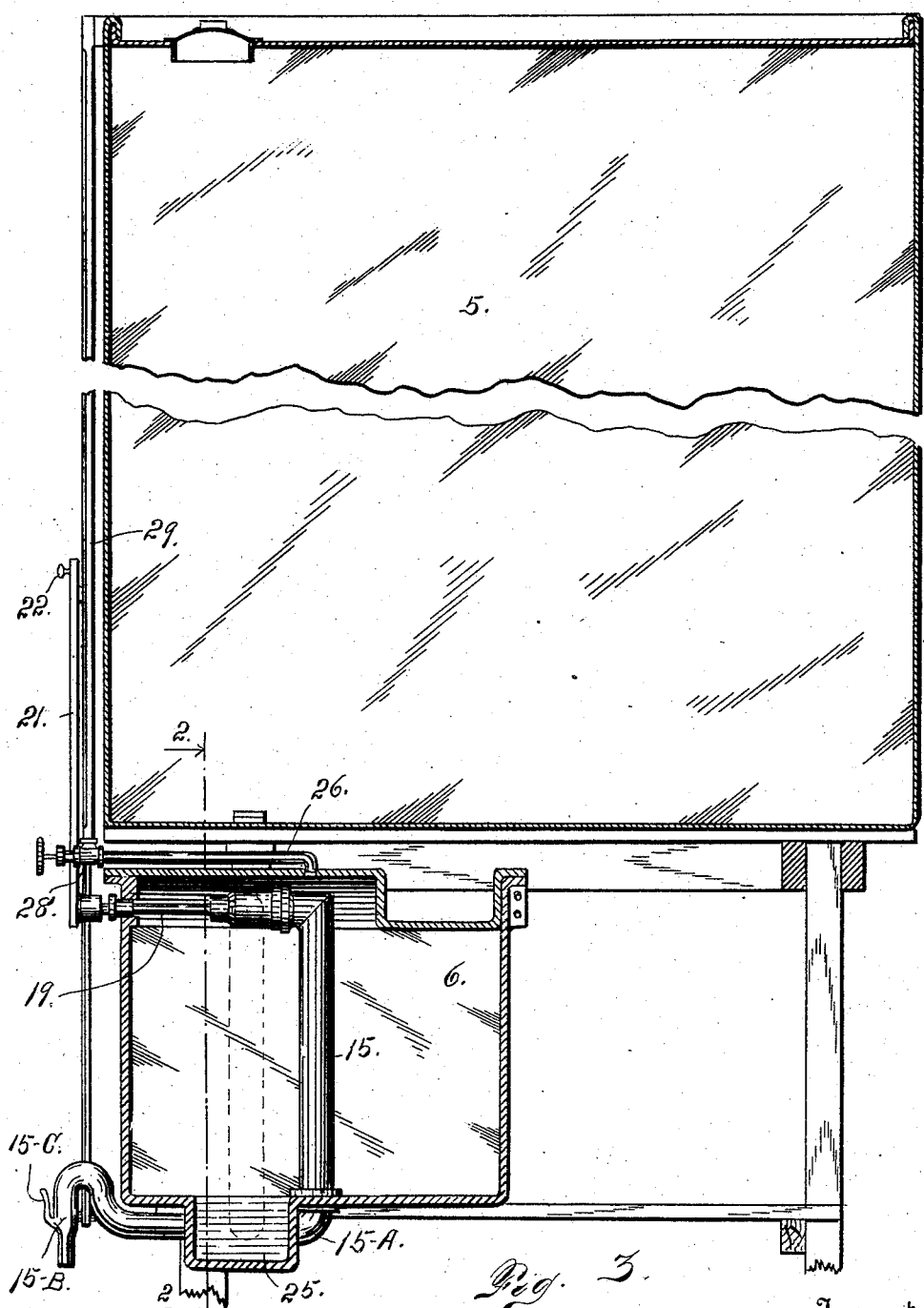

UNITED STATES PATENT OFFICE.

ERNEST O. LINTON, OF DENVER, COLORADO, ASSIGNOR OF ONE-HALF TO HENRY V. JOHNSON AND ONE-HALF TO THE E. O. LINTON MANUFACTURING COMPANY, BOTH OF DENVER, COLORADO.

SIPHONIC MEASURING APPARATUS.

No. 851,241. Specification of Letters Patent. Patented April 23, 1907.

Application filed June 8, 1906. Serial No. 320,919.

*To all whom it may concern:*

Be it known that I, ERNEST O. LINTON, a citizen of the United States, residing at the city and county of Denver and State of Colorado, have invented certain new and useful Improvements in Siphonic Measuring Apparatus; and I do declare the following to be a full, clear, and exact description of the invention, such as will enable other skilled in the art to which it appertains to make and use the same, reference being had to the accompanying drawings, and to the letters and figures of reference marked thereon, which form a part of this specification.

My invention relates to improvements in liquid measuring apparatus, of the class in which the syphonic principle is employed for the purpose of drawing liquid from a measuring tank.

In my improved construction the liquid intake-leg of the syphon also serves for the intake of the air which breaks the syphon; and this intake-leg is arranged when in its uppermost position, to open a valve communicating with the supply tank for the purpose of replenishing the measuring tank. When, however, the intake-leg is lowered for the purpose of removing a quantity of liquid, the valve previously held open, is released and closes the communication between the supply tank and the measuring tank.

Having briefly outlined my improved construction, I will proceed to describe the same in detail reference being made to the accompanying drawing in which is illustrated an embodiment thereof.

In this drawing, Figure 1 is a front elevation of my improved liquid-measuring apparatus, the supply tank being partly broken away. Fig. 2 is a section taken on the line 2—2 Fig. 3 viewed in the direction of the arrow. Fig. 3 is a vertical section taken on the line 3—3 Fig. 2. Fig. 4 is a top plan view of the measuring tank with the top plate removed and shown partly in section. Figs. 5 and 6 are sectional views of the valve mechanism for controlling the communication between the supply and measuring tanks.

The same reference characters indicate the same parts in all the views.

Let the numeral 5 designate a tank containing a supply of liquid to be furnished to the measuring tank 6 which may be located in suitable proximity to the supply tank. In this case the measuring tank is located below the supply tank and communicates therewith by a passage 7 controlled by a valve 8 actuated by a spring 9. In the lower part of the passage 8, is located the seat 10 for the valve 8, the latter being normally spring-pressed toward its seat. Connected with the lower extremity of the valve stem 12 is a valve member 13 which when the intake-leg 14 of the syphon is at its upward limit of movement as shown in Fig. 2, closes the inner extremity of the said leg. The action of this leg, however, upon the valve 8 is to unseat the latter valve and allow the liquid from the supply tank to pass into the measuring tank. The elbow extremity 18 of the intake-leg 14 remote from the valve seat extremity, engages the upper extremity of the discharge leg 15 of the syphon. The intake-leg is movable and is reinforced and beveled as shown at 16 to engage the flared extremity 17 of the discharge leg. The elbow extremity of the intake-leg is connected with a spindle 19 passing through a stuffing box 20 in one wall of the measuring tank. This spindle is in alignment with the axis of rotation of the intake-leg when the latter is adjusted in the measuring tank for the purpose of drawing off different quantities of liquid.

To the outer exposed extremity of the spindle 19, is rigidly secured an actuating arm 21 provided with a handle 22. This arm when moved for the purpose of actuating the intake-leg, passes over a dial 23 graduated in liquid measuring denominations. Upon this dial are adjustably mounted a number of pointers 24, which may be said to indicate the price of the quantity of liquid drawn from the measuring tank when the arm 21 is moved to the mark where the pointer is located. For instance if a person wishes to buy 25 cts. worth or any other quantity of liquid by specifying the price instead of specifying the quantity, these pointers 14 are exceedingly convenient since a pointer may be located for each of the various prices which experience has shown customers are liable to specify in calling for a liquid as oil. It is only necessary then for the seller to adjust the arm 21 to correspond with the pointer which indicates the price which the customer desires to pay.

In the lower part of the measuring tank is formed a channel or depression 25 adapted to receive the inlet elbow of the intake-leg. The depth of this depression or recess is sufficient to immerse the intake extremity of this leg, so that no air will enter the leg to break the syphon until after all of the liquid has been drawn from the body of the tank.

The measuring tank is provided with a vent tube 26 communicating with its upper extremity which is provided with a housing 27 extending above the body of the tank. This housing incloses the elbow 18 of the intake-leg, and the spindle 19 connected therewith for operating purposes as heretofore described. The vent tube 26 is provided with a cut-off valve 28 whereby the vent tube may be closed if for any reason it should be desirable to do so. This vent tube is connected with an upwardly-projecting gauge tube 29 for determining the depth of liquid in the supply tank. The discharge leg 15 of the syphon extends downwardly from its jointed connection with the intake-leg, through the measuring tank and communicates with a conduit 15^A leading to a discharge nozzle 15^B. The discharge nozzle 15^B is provided with a hook 15^C upon which a bucket or other receptacle may be hung while drawing liquid from the measuring tank.

From the foregoing description the use and operation of my improved syphonic measuring apparatus will be readily understood. I will now assume that the measuring tank is empty to begin with, and the intake-leg 14 of the syphon is drawn downwardly into the recess 25, or in position to draw off the liquid from the tank. Now in order to fill the measuring tank, it is only necessary to actuate the arm 21 sufficiently to throw the intake-leg 14 to the position shown in full lines in Fig. 2. As this leg is raised in the measuring tank, its inlet extremity engages the valve member 13, and lifts the valve member 8 sufficiently to open the same and allow the liquid to flow freely from the supply tank into the measuring tank. During this operation of filling the measuring tank, the intake-leg 14 is closed by the valve member 13 whereby the liquid entering through the valve casing cannot enter the intake-leg. As the liquid flows into the measuring tank, the air will escape through the vent tube 26 and the gauge tube 29 whose upper extremity is open to the atmosphere. As soon as the liquid in the gauge tube reaches the depth in the supply tank 6, the liquid will of course cease to flow from one tank to the other. Now if it is desired to draw any predetermined quantity of liquid from the measuring tank, the arm 21 is adjusted with reference to the graduated dial 23, in order to draw the desired quantity. It is evident that this dial may be provided with characters as figures to indicate the quantity of liquid that will be drawn by any desired adjustment of the arm 21. When the arm 21 is moved, the intake-leg of the syphon is given a corresponding movement, and the liquid will continue to flow from the measuring tank until the inlet extremity of the intake-leg is sufficiently exposed above the level of the liquid to allow the air to enter and break the syphon. As soon as the intake-leg is moved downwardly in the measuring tank in order to draw liquid, the valve member 8 is released and the recoil of the spring 9 acting thereon, seats the valve member 8 and cuts off the flow of liquid from the supply tank to the measuring tank.

Having thus described my invention, what I claim is:

1. In syphonic liquid measuring apparatus, the combination with a supply tank, and a measuring tank, of a normally closed valve for cutting off communication between the supply tank and the measuring tank, and an intake syphon leg movably mounted in the measuring tank and so arranged that when its intake extremity is at its upward limit of movement in the tank, said extremity will act to unseat the said valve and open communication between the two tanks.

2. In apparatus of the class described, the combination with a measuring tank, of a normally closed valve for controlling the supply to the measuring tank, an auxiliary valve member connected with the valve, and an intake syphon leg movably mounted in the measuring tank and so arranged that when its intake extremity is raised to its limit of upward movement in the measuring tank, its intake extremity will be closed by the auxiliary valve member and the main valve simultaneously unseated whereby the passage for the supply of liquid to the measuring tank is opened.

3. In a syphonic liquid measuring apparatus, the combination with a supply tank, a measuring tank and a valve normally cutting off communication between the tanks, the intake leg being so arranged that when its intake extremity is raised to its upward limit of movement in the tank, it will unseat the said valve, of a stationary syphon discharge leg, and a movable intake-leg, the two legs being provided with cooperating parts to form a tight joint where the intake leg joins the discharge leg, a spindle connected with the intake-leg and in alignment with its axis of rotation, the said spindle having one extremity exposed outside of the measuring tank, a manipulating arm connected with the exposed extremity of the spindle, and a graduated dial mounted exteriorly and over which the manipulating arm is arranged to travel.

4. The combination with a supply tank, a measuring tank and a valve for cutting off communication between the two tanks, of a stationary discharge syphon leg, a movable intake syphon leg located in the measuring tank and movably connected with the discharge leg, means exteriorly located for operating the intake leg, an auxiliary valve connected with the main valve and adapted to close the inlet extremity of the intake syphon leg when the latter is raised to a predetermined height within the measuring tank.

5. The combination of a measuring tank, a supply tank, a normally closed valve for cutting off the flow of liquid from the supply tank to the measuring tank, the said valve being provided with an auxiliary valve member and a movable intake syphon leg adapted to be controlled from the outside of the tank and arranged when raised to its limit of movement within the measuring tank to action the auxiliary valve member, to unseat the said valve, the auxiliary valve member acting simultaneously to close the inlet extremity of the said intake-leg.

6. The combination with a supply tank, a measuring tank and a valve normally closing communication between the two tanks, of a movable intake leg so arranged that when raised to a predetermined limit within the tank, its intake extremity will serve to unseat the said valve, a manipulating arm connected with the syphon leg and located outside of the tank, a dial located in proximity to the said arm, and pointers adjustably mounted on said dial for the purpose set forth.

In testimony whereof I affix my signature in presence of two witnesses.

ERNEST O. LINTON.

Witnesses:
DENA NELSON,
A. J. O'BRIEN.